United States Patent [19]

Dauwalder

[11] 4,243,258
[45] Jan. 6, 1981

[54] TREE HARVESTER

[75] Inventor: Fred R. Dauwalder, Yorkville, Ill.

[73] Assignee: Caterpillar Tractor Co., Peoria, Ill.

[21] Appl. No.: 38,984

[22] PCT Filed: Mar. 5, 1979

[86] PCT No.: PCT/US79/00131

§ 371 Date: Mar. 5, 1979

§ 102(e) Date: Mar. 5, 1979

[87] PCT Pub. No.: WO80/01865

PCT Pub. Date: Sep. 18, 1980

[51] Int. Cl.³ .................................................. A01G 23/08
[52] U.S. Cl. ...................................... 294/88; 144/3 D; 144/34 E; 294/104
[58] Field of Search .................. 144/2 Z, 3 D, 34 R, 144/34 E, 309 AC; 294/106, 104, 88

[56] References Cited

U.S. PATENT DOCUMENTS

| Re. 29,235 | 5/1977 | Kurelek | 144/3 D |
|---|---|---|---|
| 3,468,352 | 9/1969 | Larson et al. | 144/34 E |
| 3,613,752 | 10/1971 | Davis, Jr. | 144/34 E |
| 3,664,391 | 5/1972 | Coffey | 144/3 D X |
| 3,795,264 | 3/1974 | Coughran, Jr. | 144/34 R |
| 3,805,860 | 4/1974 | Smith | 144/3 D |
| 3,875,983 | 4/1975 | Kurelek | 144/34 R |
| 3,886,985 | 6/1975 | Iarocci et al. | 144/309 AC |
| 3,910,326 | 10/1975 | Tucek | 144/34 R |
| 3,911,981 | 10/1975 | Tucek | 144/34 R |
| 4,175,598 | 11/1979 | Stoychoff | 144/34 E |

FOREIGN PATENT DOCUMENTS 578033  10/1977  U.S.S.R. ......................... 144/3 D

Primary Examiner—W. Donald Bray
Attorney, Agent, or Firm—Ralph E. Walters

[57] ABSTRACT

PCT No. PCT/US79/00131 Sec. 371 Date Mar. 5, 1979, Sec. 102(e) Date Mar. 5, 1979 PCT Filed Mar. 5, 1979 PCT Pub. No. WO80/01865 PCT Pub. Date Sept. 18, 1980.

A tree harvester (12) is provided with an apparatus (20) for accumulating trees, one at a time. The apparatus includes a single, multiple accumulator arm (58) which has three joined members (30,40,50). A first member (30) is pivotally connected to the frame (18) of the tree harvester (12) and the second member (40) is pivotally connected to the first member (30) and movable relative to the first member (30) between an open position and a closed position. The second member (40) is maintained in one of the open and closed positions during pivotal movement of the first member (30). A third member (50) is pivotally connected to the second member (40) and biased so that it can be folded and removed from between a tree (26) and the frame (18) and unfolded to later accumulate trees against the frame (18). This simple structure uses only one movable accumulator arm (58) instead of two.

9 Claims, 7 Drawing Figures

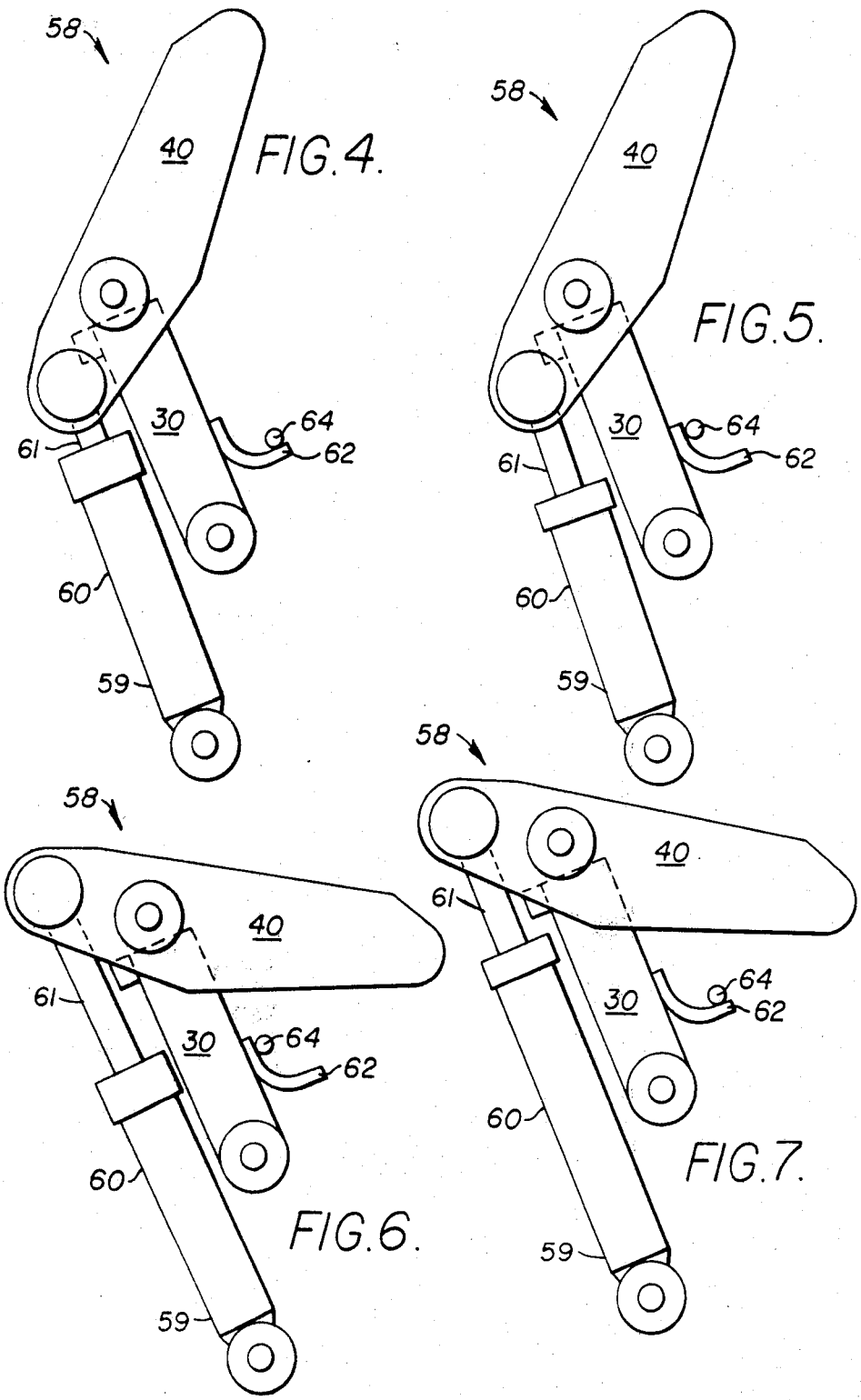

1

TREE HARVESTER

TECHNICAL FIELD

This invention relates to tree harvesting machine equipped with an apparatus for accumulating the trees one at a time and, more particularly, to accumulators having only one movable arm for accumulating trees one at a time.

BACKGROUND ART

In recent years, the cost of harvesting trees has increased thereby compelling a search for more economical harvesting methods and apparatus. In the pioneer days, trees were manually harvested one at a time with an axe or saw. This method was satisfactory for pioneer days but as the demand for lumber grew, more productive methods were discovered. Today, there is a variety of logging equipment including tree fellers, debarkers and delimbers which greatly increase productivity. It is desirable to further increase productivity.

To increase productivity tree fellers have been constructed which severe several small trees at one time. While this has the advantage of saving time, it is useful only with small trees which grow very close together.

Normally, larger trees are cut one at a time and individually moved or stacked so that the tree harvester can proceed to the next tree. A certain amount of time is involved in moving or stacking cut trees and during this time the tree harvester is not cutting other trees and is therefore unproductive. Recent tree harvesters have been equipped with accumulators which accumulate cut trees one at a time and hold the trees until it is filled to its capacity of several trees. The trees are then stacked or gang loaded for transport in about the same time it takes to stack or load a single tree. While this is an improvement, there is still a need to be more economical. Apparently, the machines are operated at full human capacity; so, any improvements must relate to the machines themselves.

The state of the art of accumulators for tree harvesters is exemplified by the following U.S. Pat. Nos.:

| U.S. Pat. No. | Date | Inventor |
| --- | --- | --- |
| 3,664,391 | May 23, 1972 | H. D. Coffey |
| 3,805,860 | April 23, 1974 | L. N. Smith |
| 3,875,983 | April 8, 1975 | J. Kurelek |
| RE 29,235 | May 31, 1977 | J. Kurelek |
| 3,886,985 | June 3, 1975 | A. Larocci et al |
| 3,910,326 | Oct. 7, 1975 | F. Tucek |
| 3,911,981 | Oct. 14, 1975 | F. Tucek |

U.S. Pat. Nos. 3,875,983, RE 29,235, and 3,886,985 are similar in construction and operation and each utilize two pairs of movable arms. Each arm of each pair of arms is pivotally movable requiring complicated, and therefore expensive, parts and connections to achieve the movement. Similarly, U.S. Pat. No. 3,664,391 uses two pairs of complicated arms with each arm of each pair of arms being pivotally movable. It is therefore desirable to have pairs of arms in which each arm is more simply constructed.

U.S. Pat. No. 3,805,860 uses a single arm for holding the severed trees instead of a pair of arms. Unfortunately, two hydraulic cylinders are required to manipulate the tree accumulating arm so as to remove it from between the accumulated trees and a tree to be accumulated. Obviously, two cylinders double the changes for breakdown or failure and add to the cost and complexity of the accumulator arm as compared with using a single cylinder.

U.S. Pat. No. 3,911,981 uses a single, movable arm for accumulating trees; however, the arm comprises a compound linkage arrangement which, while reducing the number of extra cylinders to zero, is nevertheless a complicated structure. U.S. Pat. No. 3,910,326 has a simpler structure than U.S. Pat. No. 3,911,981. They both have chains, however, which can slip off their sprockets in a logging environment. It is therefore desirable to have a simple accumulator mechanism which can hold and accumulate harvested trees and perform in a logging environment.

DISCLOSURE OF INVENTION

The present invention is directed to overcoming one or more of the problems as set forth above.

According to the present invention, a tree harvester is provided with an apparatus for accumulating trees, one at a time. The apparatus includes a first member pivotally connected to the frame of the tree harvester. A second member is pivotally connected to the first member and movable relative to the first member between an open position and a closed position. Means are provided for maintaining the second member in one of the open and closed positions during pivotal movement of the first member. A third member is pivotally connected to the second member and movable between an open position and a closed position and biased toward the open position.

BRIEF DESCRIPTION OF THE DRAWINGS

FIG. 4 is a diagrammatic view of the accumulating arm shown in a fully open position;

FIG. 5 is a diagrammatic view of the accumulating arm shown in a partially open position;

FIG. 6 is a diagrammatic view of the accumulating arm shown in a fully closed position; and FIG. 7 is a diagrammatic view of the accumulating arm shown in a partially closed position.

BEST MODE FOR CARRYING OUT THE INVENTION

Figure 1:
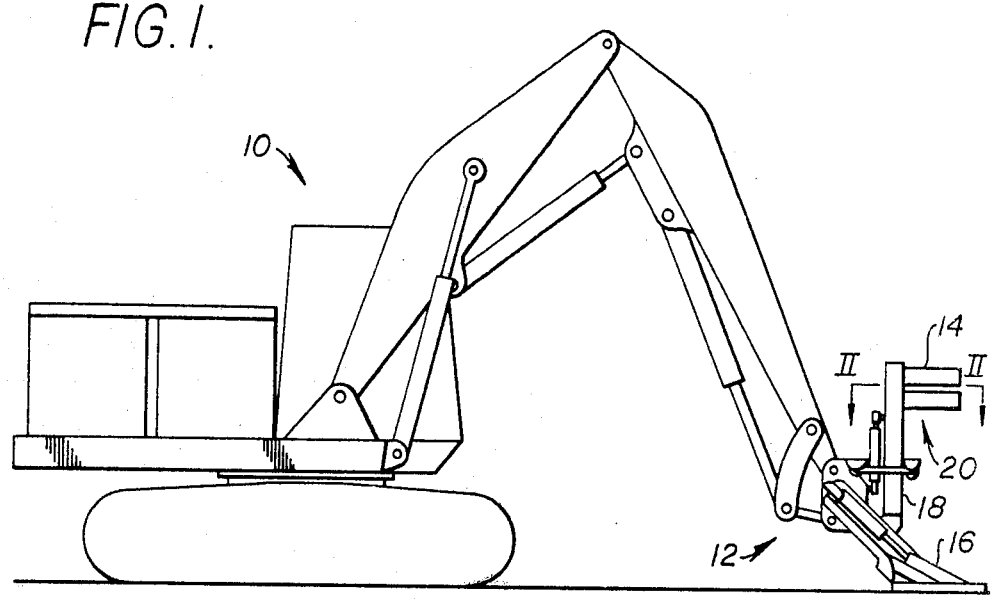
FIG. 1 is a diagrammatic side view of a tree harvester with an accumulating apparatus.

Referring to FIG. 1, a vehicle, such as an excavator 10, is equipped with a tree harvester attachment 12 connected to the stick and boom of the excavator 10. The tree harvester 12 is movable, vertically and laterally, as a regular excavator bucket would be movable. The tree harvester 12 has a pair of grapple arms 14 and a pair of shears 16 mounted on an upright frame 18. The shears 16 are positioned below the grapple arms 14 and are both controlled by fluid cylinders (not shown) as is known in the prior art.

Figure 2:
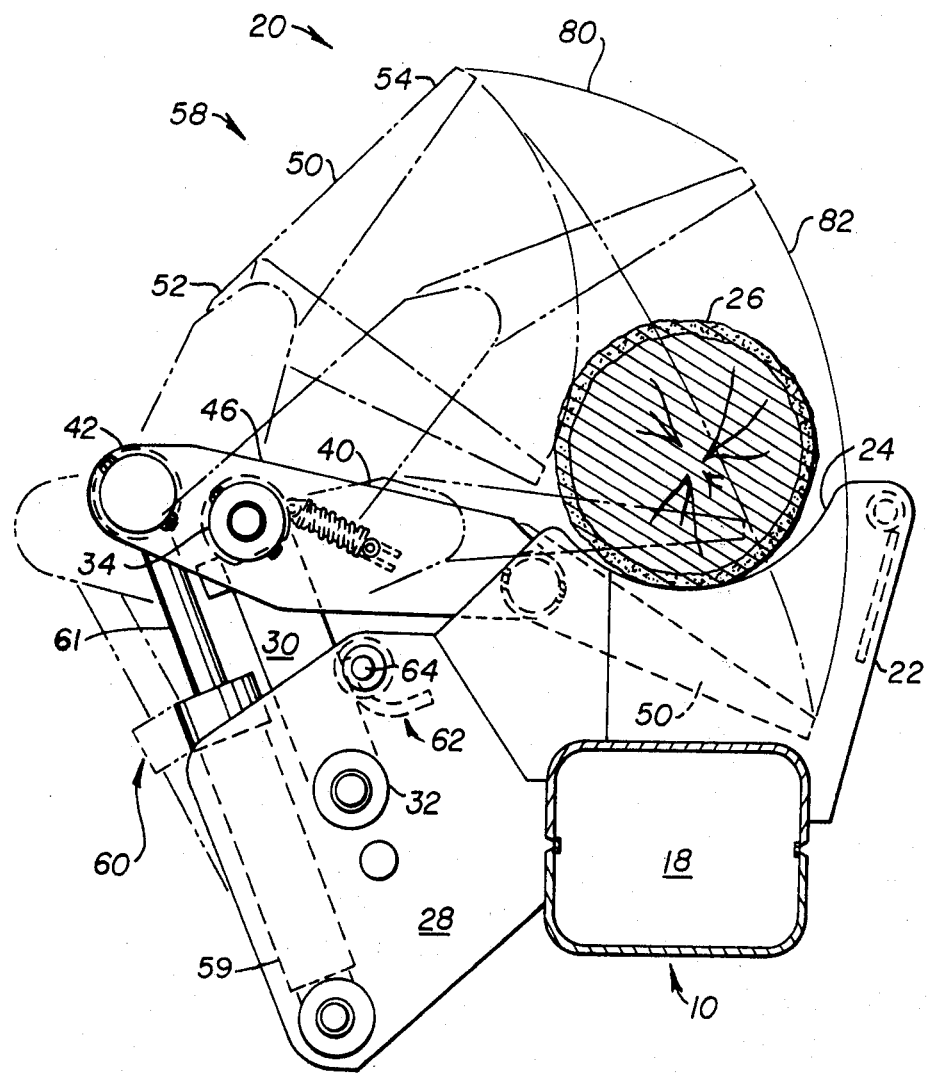
FIG. 2 is view taken along line II—II of FIG. 1 illustrating the accumulating apparatus in greater, somewhat enlarged detail.

Referring to FIGS. 1 and 2, a tree accumulating apparatus 20 is attached to the frame 18 and positioned intermediate the grapple 14 and shears 16. The tree accumulating apparatus 20 includes a support member 22 which is connected to the frame 18 and which has a curved edge portion 24 for receiving one or more trees 26. There are preferably two support members 22 connected to the frame 18 and vertically spaced a preselected distance one from the other.

Figure 3:
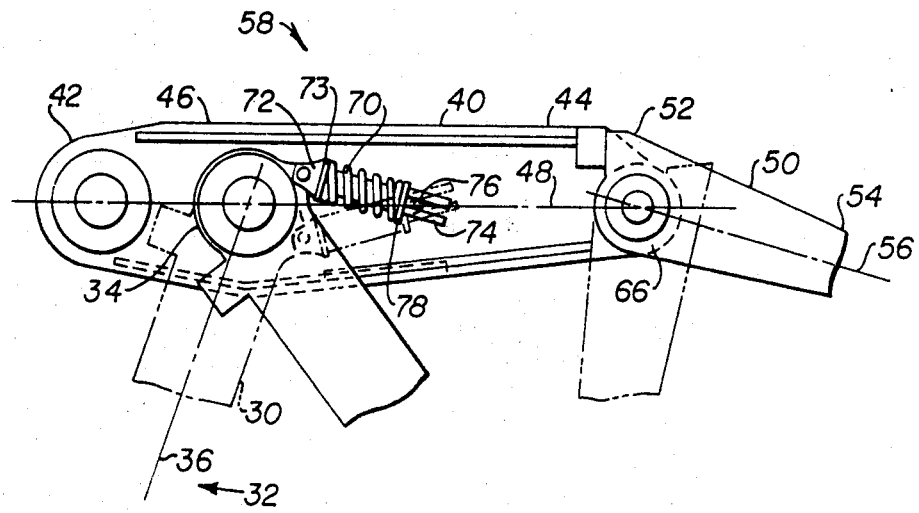
FIG. 3 is a diagrammatic view similar to FIG. 2 showing the accumulating arm of the accumulating apparatus.

Referring to FIGS. 2 and 3, the tree accumulating apparatus 20 also includes a mounting bracket 28 which is connected to the frame 18. A first member 30 has a first end portion 32 pivotally connected to the bracket 28, a second end portion 34, and a longitudinal axis 36. A second member 40 has first and second end portions 42,44, a middle portion 46, and a longitudinal axis 48. The middle portion 46 is pivotally connected to the second end portion 34 of the first member 30. A third member 50 has a first end portion 52 pivotally connected to the second end portion 44 of the second member 40, a second, free end portion 54, and a longitudinal axis 56. The three members 30,40 and 50 comprise an accumulating arm 58.

Referring to FIG. 2, means, such as fluid cylinder 60, are provided for pivotally moving the second member 40 about the second end portion 34 of the first member 30. The cylinder 60 has its head end pivotally connected to the bracket 28 and its rod end pivotally connected to the first end portion 42 of the second member 40. The manner in which the cylinder 60, first member 30 and second member 40 are interconnected facilitates movement of both members 30,40, as will be more fully explained below.

Means, such as hook 62 and pin 64, are provided for limiting the pivotal movement of the first member 30 relative to the bracket 28 to a value within a range of about 0 to 25 degrees. The hook 62 is preferably connected to the first member 30 and the pin 64 preferably protrudes vertically from the bracket 28. As an alternative to the hook 62, a slotted link can be used. The slotted link can have a simple slot and be pivotally connected to one of the first member 30 and bracket 28 or can be nonpivotally attached and have a triangular slot.

Referring to FIG. 3, the third member 50 is movable relative to the second member 40 between a first, open position at which the axes 48,56 of the second and third members 40,50 are generally aligned and a second, closed position at which the second, free end 54 of the third member 50 is displaced toward the second member 40. At the second position the axes 48,56 form a preselected angle.

Biasing means, such as a roll spring 66, urges the third member 50 towards the first position.

The second member 40 is movable relative to the first member 30 between an open position and a closed position. Means, such as over-center spring 70, is provided for holding the second member 40 in one of the open and closed positions. The over-center spring 70 is preferably a coil spring which has one end connected to the first member 30 and the other end connected to the second member 40.

The coil spring 70 is preferably positioned about a bracket 72 which has a cap portion 73 connected to the first member 30 and a slotted end portion 74. The end portion 74 fits on a pin 76 and is slidably movable on the pin 76. A washer 78 and the cap 73 keep the spring 70 on the spring bracket 72 in a compressed state.

The pin 76 is positioned at a location on the middle portion 46 of the second member 40 and is on the axis 48. When the second member 40 is in its open position the cap portion 73 and the spring 70 are on one side of the axis 48 and when the second member 40 is in its closed position the cap 73 and spring 70 are on the other side of the axis 48.

Referring to FIGS. 4-7, the accumulating arm 58 is shown as it moves from a fully open position (FIG. 4) to a fully closed position (FIG. 6). At the fully open position, the first and second members 30,40 are each in their open position, the cylinder 60 is fully retracted, and the free end of the hook 62, the end nearest the frame 18, is contacting the pin 64. At the fully closed position, the first and second members 30,40 are each in their closed positions, the cylinder 60 is fully extended, and the fixed end of the hook 62, the end of the hook 62 fixed to the first member 30, is contacting the pin 64. By fully extended it is meant that the cylinder rod 61 is moved away from the cylinder head 59 a maximum distance increasing the effective length of the cylinder 60 and by fully retracted it is meant that the cylinder rod 61 is moved toward the cylinder head 59 a maximum distance decreasing the effective length of the cylinder 60.

At the partially open position shown in FIG. 5, the first member 30 is in its closed position, the second member 40 is in its open position, and the cylinder is partially retracted or extended as would be the case when the arm 58 is moving from its fully open position (FIG. 4) to its fully closed position (FIG. 6). The fixed end of the hook 62 is contacting the pin 64. This is the position assumed by the arm 58 immediately before the second member 40 closes upon the application of sufficient force by the cylinder 60.

At the partially closed position shown in FIG. 7, the first member 30 is in its open position, the second member 40 is in its closed position, and the cylinder is partially extended or retracted as would be the case when the arm 58 is moving from its fully closed position (FIG. 6) to its fully open position (FIG. 4). The free end of the hook 62 is contacting the pin 64. This is the position assumed by the arm 58 immediately before the second member 40 opens upon the application of sufficient force by the cylinder 60.

As the accumulating arm 58 is closed from its fully open position (FIG. 4) by the extension of the cylinder 60 from its fully retracted position, the over-center spring 70 holds the second member 40 in its open position with respect to the first member 30 until the fixed end of the hook 62 contacts the pin 64 preventing further rotation of the first member 30 with respect to the frame 18. This resulting position is depicted by FIG. 5.

Further extension of cylinder 60 past the position shown in FIG. 5 requires the cylinder force to overcome the holding force of the over-center spring 70 to move the second member 40 with respect to the stationary member 30. This motion continues as the cylinder 60 extends until a tree 26 is clamped against support member 22 or until cylinder 60 is fully extended if no tree is being clamped. This occurs at the end of each cycle when both the accumulator arm 58 and the grapple 14 are opened simultaneously to release the load of trees and the accumulator arm 58 is then allowed to close to its normally closed position (FIG. 6). In its normally closed position (see FIGS. 6 and 2) the accumulator arm 58 lies entirely behind the cradle created by the curved edge of support member 22 and therefore does not interfere with one-at-a-time harvesting of large trees. For large trees the accumulator arm 58 can remain in its relatively protected normally closed position.

The closing path of the accumulating arm 58 has two distinct segments as indicated by dashed lines 80 and 82 (FIG. 2). The first distinct segment 80 results from the movement of the accumulating arm 58 from the position shown in FIG. 4 to the position shown in FIG. 5 30. After the fixed end of the hook 62 contacts, the pin 64 (FIG. 5), the tip 54 of the arm 58 pivotally moves about the second end 34 of the first member 30 circumscribing distinct arcuate segment 82 which results in essentially rearward motion and therefore rearward clamping effort of arm 58. Rearward clamping effort is required to clamp the tree 26 against the support member 22.

As the arm 58 is opened from its fully closed position (FIG. 6) or another tree holding position by the retraction of the cylinder 60, the over-center spring 70 holds the second member 40 in its closed position with respect to the first member 30 until the free end of hook 62 contacts the pin 64 preventing further rotation of the first member 30 with respect to the frame 18. This resulting position is depicted by FIG. 7.

Further retraction of cylinder 60 requires the cylinder force to overcome the holding force of the over-center spring 70 to move the second member 40 with respect to the stationary member 30. This motion continues as the cylinder 60 retracts fully to the position shown in FIG. 4.

Like the closing path, the opening path of arm 58 has two distinct segments, the first in an essentially lateral movement of the arm 58 due to rotation of the members 30,40,50, about the end 32 of member 30 until the free end of the hook 62 contacts the pin 64. The primarily lateral movement of the arm 58 and freedom of member 50 to pivot toward the frame 18 easily enables the arm 58 to be pulled free from behind the severed trees or from between two severed trees. In the second part of the motion the arm 58 pivots about the end 34 of stationary arm 30 until the cylinder 60 is fully retracted and the arm 58 is in the fully open position (FIG. 4).

INDUSTRIAL APPLICABILITY

In operation, the excavator 10 is driven close to the trees to be harvested and stopped. The stick and boom of the excavator 10 are extended to move the tree harvester attachment 12 from tree to tree during operation of the tree accumulating apparatus 20. The accumulated trees can be conveniently moved and stacked by manipulating the stick and boom or by propelling the excavator 10.

Referring to FIG. 2, the accumulating arm 58 is closed or retracted so that the third member 50 is displaced toward the frame 18 and lies between the two vertically spaced support members 22. In this retracted position, the accumulating arm 58 is close to the frame 18 and the risk of becoming entangled with tree branches or other trees is minimized.

With the shears 16 and grapple 14 in their open positions, the tree harvester 12 is moved to the tree 26. The grapple arms 14 are closed around the tree 26 and the tree 26 is positioned against the curved edge 24 of the support member 22. The shears 16 are closed about the tree 26 to sever it from its base. At this time, the grapple arms 14 hold the tree 26 against the support member 22 while the shears 16 provide vertical support.

At this time, the arm 58 is still retracted with the first member 30 in its first, closed position, the second member 40 in its first, closed position, and the third member 50 in its first, open position. While the shears 16 and grapple 14 secure the cut tree 26, the arm 58 is opened and then closed to accumulate and hold the tree 26.

To open the arm 58, the cylinder 60 is retracted causing the first member 30 to pivot from its first, closed position to its second, open position. The pivotal movement of the first member is stopped by the limiting means 62 when the end of the hook 62 nearest the frame 18 contacts the pin 64.

As the first member 30 pivots, the third member 50 pivots from its first, open position to its second, closed position so that it is withdrawn from between the tree 26 and frame 18. When the third member 50 is clear of the tree 26, the biasing spring 66 urges the third member 50 toward its first, open position. Depending on the diameter of the tree 26, the third member 50 may not be returned to its open position merely in response to the first member 30 moving to its open position. For example, with a small tree the third member 50 may return to its open position, while it may not return with a somewhat larger tree.

To insure that the third member 50 does return to its open position, the second member 40 moves from its first, closed position to its second, open position thereby withdrawing the free end 54 of the third member 50 from the tree 26. Because of the over-center spring 70, the second member 40 cannot move from its closed position to its open position until the first member 30 moves to its open position wherein the end of the hook 62 nearest the frame 18 abuts the pin 64. By having the second member 40 remain closed, the third member 50 is first moved laterally, then pivotally which allows it to slip from between the tree 26 and support 22 without expending effort to move the tree 26.

When the first member 30 moves to its open position, the second member 40 moves from its closed position to its open position upon the urging of the retracting cylinder 60 which pivots the second member 40 about the second end 34 of the first member 30. Thus, the cylinder 60 actually moves both members 30,40. This pivotal movement of the second member 40 causes the third member 50 to pivot if the free end 54 of the third member 50 has not cleared the tree 26.

When the second member 40 is in the closed position, the force exerted by the cylinder 60 tending to pivot the second member 40 about the first member 30 must overcome the force of the spring 70 which tends to keep the members 30,40 in the closed position. When the force is overcome, the second member 40 moves toward its open position.

When the arm 58 has cleared the tree 26, the cylinder 60 is extended to close the arm 58 around the tree 26 with the third member 50 positioned on one side of the tree 26 and the curved edge 24 of the support member 22 on the other side of the tree 26. The arm 58 securely holds the tree 26 when the shears 16 are opened and their vertical support is removed. The grapple arms 14 are opened to receive a succeeding tree against the third member 50 and first tree 26. The grapples 14 are then closed to hold the succeeding tree which is then severed by the shears 16. The arm 58 is withdrawn as previously described and then closed to securely hold and accumulate both the original tree 26 and the succeeding tree. This process is repeated until the capacity of the tree accumulating apparatus 20 is reached.

Other aspects, objects and advantages of this invention can be obtained from a study of the drawings, the disclosure, and the appended claims.

I claim:

1. A tree accumulating apparatus (20) for a multiple tree harvester (12) for accumulating trees (26) one at a time, said tree harvester (12) having a frame (18) comprising:
   a first member (30) having a first end portion (32) pivotally connected to the frame (18), a second end portion (34), and a longitudinal axis (36);
   a second member (40) having first and second end portions (42,44), a middle portion (46), and a longitudinal axis (48), said middle portion (46), being pivotally connected to the second end portion (34) of the first member (30), said second member (40) being movable relative to the first member (30) between an open position and a closed position;
   means (70) for holding the second member (40) in one of the open and closed positions;
   means (60) for pivotally moving the second member (40) about the second end portion (34) of the first member (30);
   a third member (50) having a first end portion (52) pivotally connected to the second end portion (44) of the second member (40), a second, free end portion (54), and a longitudinal axis (56); and
   biasing means (66) for urging the third member (50) towards a position at which the axes (48,56) of the second and third members (40,50) form a preselected angle.

2. An apparatus, as set forth in claim 1, wherein the holding means (70) includes a coil spring (70) connected at one end to the first member (30) and connected at the other end to the second member (40).

3. An apparatus (20), as set forth in claim 1, wherein the moving means (60) includes a fluid cylinder (60) pivotally connected to the frame (18) and second member (40).

4. An apparatus (20), as set forth in claim 1, including means (62) for limiting the pivotal movement of the first member (30).

5. An apparatus (20), as set forth in claim 4, wherein the limiting means (62) includes
   a pin (64) connected to one of the frame (18) and first member (30); and
   a hook (62) connected to the other of the frame (18) and first member (30).

6. An apparatus (20), as set forth in claim 4, wherein the limiting means (62) limits the pivotal movement of the first member (30) to a value within a range of about 0 to 25 degrees.

7. A tree accumulating apparatus (20) for a multiple tree harvester (12) for accumulating trees (26) one at a time, said tree harvester (12) having a generally vertically positioned frame (18), comprising:
   a support member (22) connected to the frame (18);
   a first member (30) pivotally connected to the frame (18) and movable between a first position at which the first member (30) is displaced from the support member (22) and a second position at which the first member (30) is displaced toward the support member (22);
   a second member (40) having first and second end portions (42,44), a middle portion (46) and a longitudinal axis (48), said middle portion (46) being pivotally connected to the first member (30) and movable between a closed position at which the second end portion (44) of the second member (40) is displaced toward the first member (30) and an open position at which the second end portion (44) of the second member (40) is displaced from the first member (30);
   means (70) for holding the second member (40) in one of the open and closed positions during movement of the first member (30) from one of the first and second positions to the other of the first and second positions;
   means (60) for moving the first and second members (30,40), said means (60) being connected to the first end portion (42) of the second member (40) and to the frame (18); and
   a third member (50) having a longitudinal axis (56) and being pivotally connected to the second end portion (44) of the second member (40), said third member (50) being displaced toward the frame (18) in response to the first member (30) being at the second position and the second member (40) being in the closed position, the axes (48,56) of the second and third members (40,50) forming a generally straight line at the displaced position of the third member (50) toward the frame (18).

8. An apparatus (20), as set forth in claim 7, wherein said holding means (70) is a coil spring (70) having one end connected to the first member (30) and the other end connected to the middle portion (44) of the second member (40).

9. An apparatus (20), as set forth in claim 8, including a biasing means (66) for urging the third member (50) to a position relative to the second member (40) at which the axes (48,56) of the second and third members (40,50) form a generally straight line, said third member (50) being pivoted on the second member (40) and forming a generally right angle with the second member (40) in response to being removed from between the frame and a tree (26) being urged against the support member (22) as the first and second members (30,40) move from the second and closed positions, respectively, to the first and open positions, respectively.

* * * * *